US009122030B2

(12) United States Patent
Xie (10) Patent No.: US 9,122,030 B2
(45) Date of Patent: Sep. 1, 2015

(54) OPTICAL MODULE INCLUDING A CLAMP

(75) Inventor: Boping Xie, San Ramon, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 67 days.

(21) Appl. No.: 13/617,809

(22) Filed: Sep. 14, 2012

(65) Prior Publication Data

US 2013/0071072 A1   Mar. 21, 2013

Related U.S. Application Data

(60) Provisional application No. 61/535,237, filed on Sep. 15, 2011.

(51) Int. Cl.
*G02B 6/36* (2006.01)
*G02B 6/42* (2006.01)

(52) U.S. Cl.
CPC ............ *G02B 6/4277* (2013.01); *G02B 6/4278* (2013.01); *G02B 6/4292* (2013.01)

(58) Field of Classification Search
CPC .. G02B 6/3897; G02B 6/4246; G02B 6/3893; G02B 6/3898; G02B 6/4201; H01R 13/62933; H01R 13/627; H01R 13/6275
USPC ............ 385/92; 439/352, 157, 372, 160, 638, 439/76.1
See application file for complete search history.

(56) References Cited

U.S. PATENT DOCUMENTS

| | | | |
|---|---|---|---|
| 6,439,918 B1 * | 8/2002 | Togami et al. ................ 439/372 |
| 6,758,699 B1 | 7/2004 | Hwang et al. ................ 439/676 |
| 6,805,573 B2 * | 10/2004 | Phillips et al. ................ 439/352 |
| 6,994,478 B1 | 2/2006 | Chiu et al. ...................... 385/88 |
| 7,004,647 B2 | 2/2006 | Malagrino, Jr. et al. ........ 385/92 |
| 7,101,093 B2 * | 9/2006 | Hsiao et al. ...................... 385/92 |
| 7,114,857 B1 | 10/2006 | Kayner et al. .................. 385/88 |
| 7,114,984 B2 * | 10/2006 | Shirk et al. ..................... 439/372 |
| 7,118,281 B2 | 10/2006 | Chiu et al. ...................... 385/53 |
| 7,303,336 B2 | 12/2007 | Kayner et al. .................. 385/55 |
| 7,351,090 B1 | 4/2008 | Moore .......................... 439/372 |
| 7,955,003 B2 | 6/2011 | Teo et al. ........................ 385/92 |
| 2004/0110406 A1 * | 6/2004 | Phillips et al. ................ 439/352 |
| 2005/0003696 A1 * | 1/2005 | Shirk et al. .................... 439/352 |
| 2006/0029335 A1 * | 2/2006 | Hsiao et al. ...................... 385/88 |
| 2006/0093287 A1 * | 5/2006 | Yoshikawa et al. ............. 385/92 |

OTHER PUBLICATIONS

"INF-8074i Specification for SFP (Small Formfactor Pluggable) Transceiver", Revision 1.0, SFF Committee, May 12, 2001, Saratoga, CA, pp. 1-38.
"SFF-8431 Specifications for Enhanced Small Form Factor Pluggable Module SFP+", Revision 4.1, SFF Committee, Jul. 6, 2009, Saratoga, CA, pp. 1-118.

* cited by examiner

*Primary Examiner* — Peter Radkowski (74) *Attorney, Agent, or Firm* — Matthew A. Peguignot; Pequignot + Myers LLC (57) ABSTRACT

An optical module is provided for mounting in a cage of a host device. The optical module includes at least one optical subassembly (OSA) and a printed circuit board (PCB) supported by a first housing structure. The optical module also includes a latch mechanism, which includes a lever and a latch, as well as a clamp. A pivot pin of the latch is rotatably supported by the first housing structure and the clamp in cooperation. Advantageously, the clamp secures both the OSA and the latch, while providing access to the PCB.

20 Claims, 11 Drawing Sheets

OPTICAL MODULE INCLUDING A CLAMP

CROSS-REFERENCE TO RELATED APPLICATIONS

This application claims priority from U.S. Provisional Patent Application No. 61/535,237 to Xie, filed on Sep. 15, 2011, which is incorporated herein by reference.

TECHNICAL FIELD OF THE INVENTION

The present invention relates to an optical module including a clamp, more particularly, to an enhanced small form factor pluggable (SFP+) transceiver module.

BACKGROUND OF THE INVENTION

Optical modules, such as transceiver or transponder modules, are used in telecommunication and data-communication applications to communicate signals between an optical network and a host device, such as a computer, a router, a switch, or a hub. Usually, optical modules are pluggable, meaning that they may be releasably mounted in a cage of the host device. A conventional optical module includes at least one optical subassembly (OSA), such as a transmitter optical subassembly (TOSA) or a receiver optical subassembly (ROSA), and a printed circuit board (PCB) housed within a two-part housing. The optical module also includes a latch mechanism to secure the optical module, once mounted, to the cage of the host device. Examples of conventional optical modules are disclosed in U.S. Pat. No. 6,439,918, issued on Aug. 27, 2002 to Togami, et al., in U.S. Pat. No. 6,994,478, issued on Feb. 7, 2006 to Chiu, et al., in U.S. Pat. No. 7,004,647, issued on Feb. 28, 2006 to Malagrino, Jr., et al., in U.S. Pat. No. 7,114,857, issued on Apr. Oct. 3, 2006 to Kayner, et al., in U.S. Pat. No. 7,118,281, issued on Oct. 10, 2006 to Chiu, et al., in U.S. Pat. No. 7,351,090, issued on Apr. 1, 2008 to Moore, and in U.S. Pat. No. 7,955,003, issued on Jun. 7, 2011 to Teo, et al., which are incorporated herein by reference.

Conventional optical modules incorporate various latch mechanisms, which, typically, include a lever and a latch. Unfortunately, some of these latch mechanisms result in undesirable height limitations. For example, in the latch mechanism disclosed in U.S. Pat. No. 7,351,090, the lever is in the form of a bail including two arms and a handle, and the two arms have bent tabs at ends thereof opposite the handle. The bent tabs, as well as the envelope in the housing required to accommodate the bent tabs, limit how close the OSA can be moved towards the bent tabs. Such height limitations restrict the positioning of the optical axis of the OSA relative to the housing, preventing direct attachment of the OSA to the PCB.

In the manufacture of some conventional optical modules, a covering housing structure is slid horizontally onto a supporting housing structure to assemble the two-part housing. Consequently, a clear sliding path is required, which limits component placement on the PCB. Furthermore, in some conventional optical modules, the OSA is only held in place after the two-part housing is assembled. During assembly and testing, before the two-part housing is assembled, the OSA is free to move and may become misaligned, making insertion of an optical-fiber connector difficult.

As the functional density of optical modules increases, these limitations and shortcomings become increasingly problematic.

SUMMARY OF THE INVENTION

An object of the present invention is to overcome some of the limitations and shortcomings of conventional optical modules.

Accordingly, the present invention relates to an optical module for mounting in a cage of a host device, comprising: a first housing structure; a first optical subassembly (OSA) supported by the first housing structure; a printed circuit board (PCB) supported by the first housing structure and electrically connected to the first OSA; a clamp mounted on the first housing structure to secure the first OSA while providing access to the PCB when the PCB is uncovered; a latch supported by the first housing structure and secured by the clamp, including a latch hook at one end thereof, an actuator at an opposite end thereof, and a pivot pin therebetween, the pivot pin rotatably supported by the first housing structure and the clamp in cooperation; a lever rotatably mounted on the first housing structure to rotate between a latched position, in which the latch hook engages the cage, and an unlatched position, in which the latch hook is disengaged from the cage, wherein, upon rotating from the latched position to the unlatched position, the lever engages the actuator to rotate the latch about the pivot pin and disengage the latch hook from the cage; and a second housing structure supported by the first housing structure to at least partially cover the PCB.

BRIEF DESCRIPTION OF THE DRAWINGS

The present invention will be described in greater detail with reference to the accompanying drawings wherein.

DETAILED DESCRIPTION OF THE INVENTION

With reference to FIGS. 1-10, the present invention provides an optical module 100, which may be any type of optical module allowing communication, e.g., uni-directional or bi-directional communication, between an optical network and a host device, such as a computer, a router, a switch, or a hub. Typically, the optical module 100 is a bi-directional optical module, such as a transceiver or a transponder. Preferably, the optical module 100 is a transceiver, more preferably, a tunable transceiver.

The optical module 100 is pluggable, meaning that it may be releasably mounted in a cage of the host device. Typically, the optical module 100 is hot pluggable, meaning that it may be mounted and unmounted while the host device is in operation. Preferably, the optical module 100 conforms to the small form factor pluggable (SFP) standard, as described in "INF-8074i Specification for SFP (Small Formfactor Pluggable) Transceiver", Revision 1.0, SFF Committee, May 12, 2001, which is incorporated herein by reference. More preferably, the optical module 100 conforms to the enhanced small form factor pluggable (SFP+) standard, as described in "SFF-8431 Specifications for Enhanced Small Form Factor Pluggable Module SFP+", Revision 4.1, SFF Committee, Jul. 6, 2009, which is incorporated herein by reference. Preferably, the cage is an SFP cage. However, the cage may take any form suitable for mating with the optical module 100.

Figure 1A:
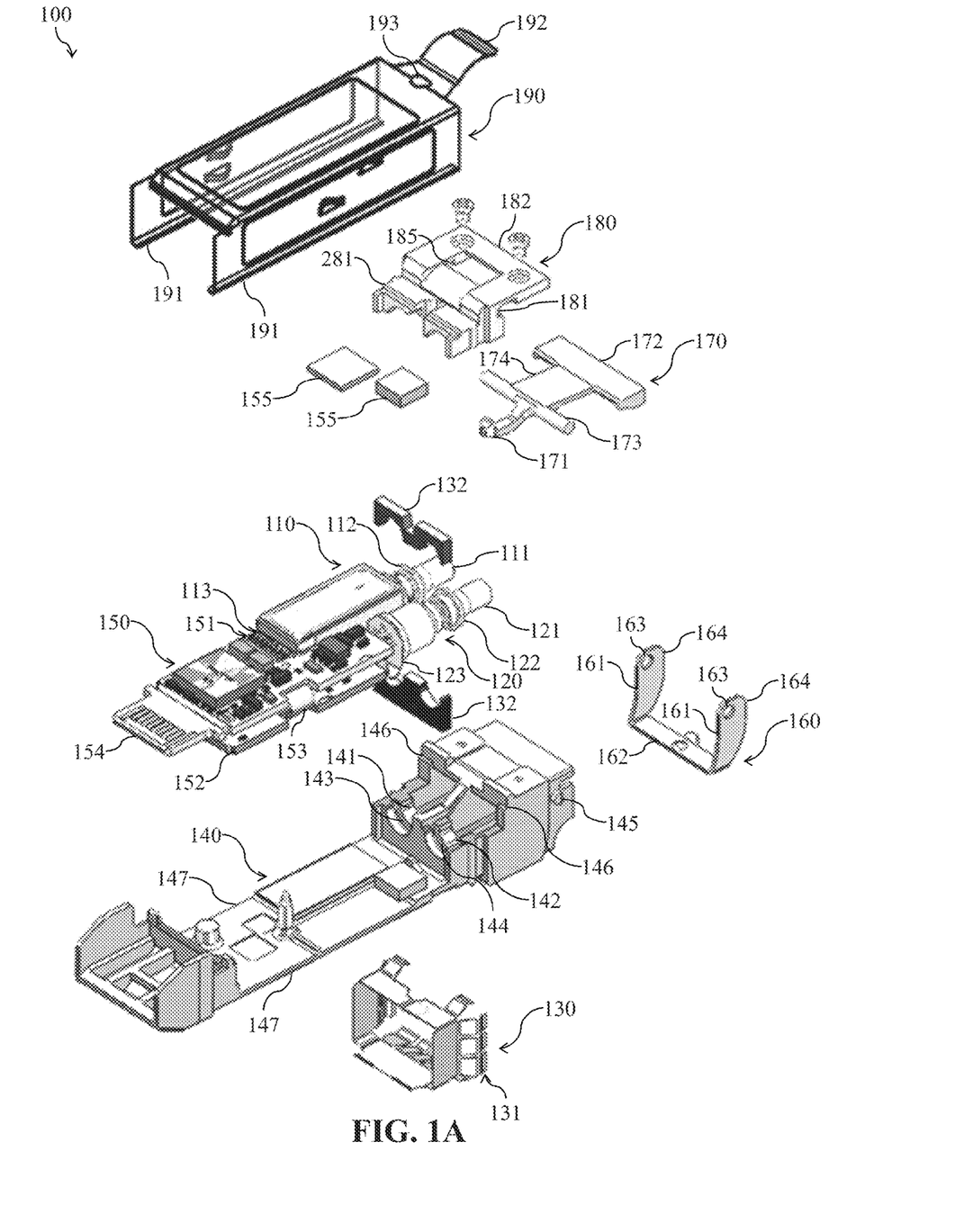
FIG. 1A is a first exploded view of an exemplary embodiment of the present invention.
Figure 1B:
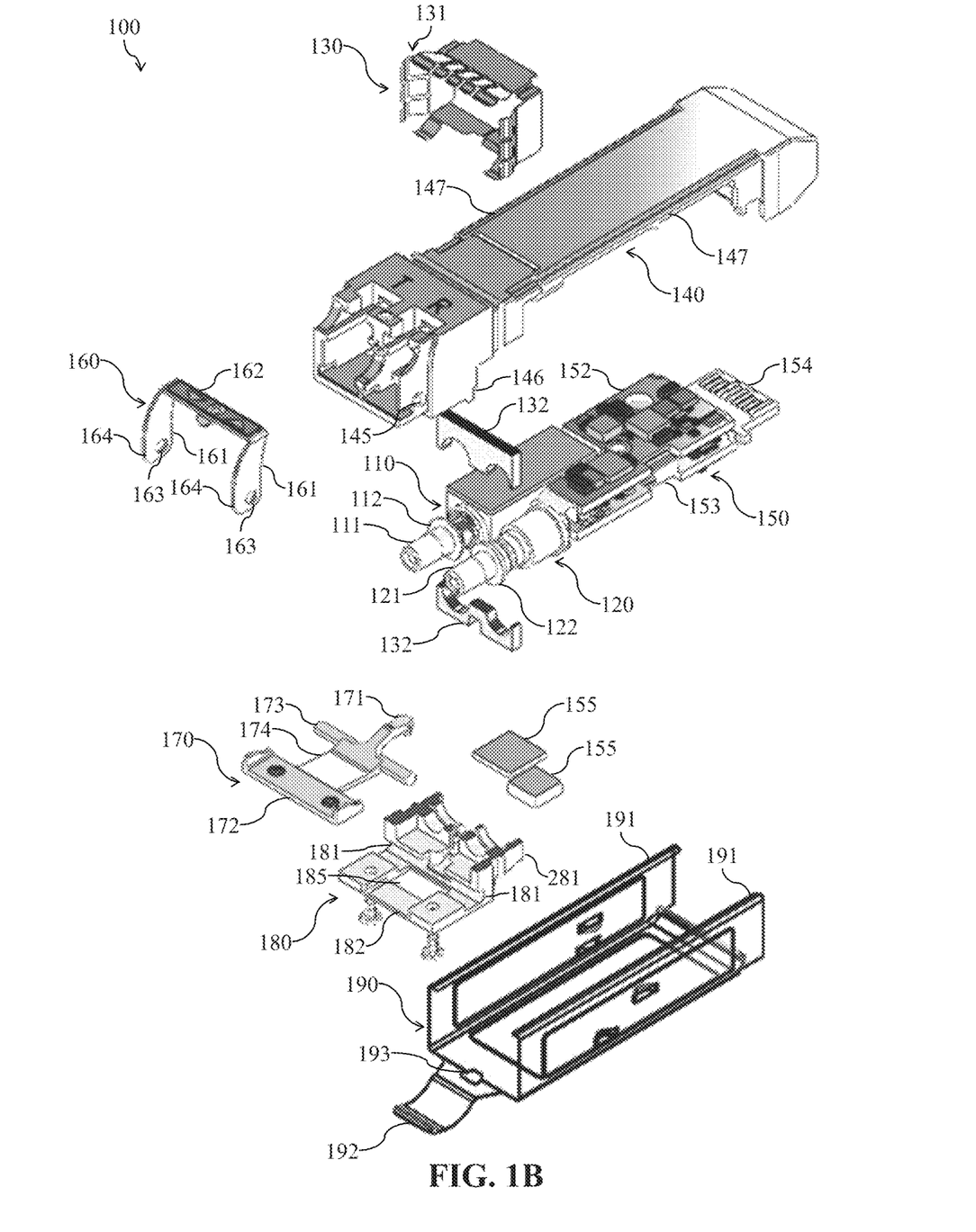
FIG. 1B is a second exploded view of the embodiment of FIG. 1A.

The optical module 100 includes at least one optical subassembly (OSA). In the illustrated embodiment, the optical module 100 includes two OSAs, a first OSA 110 and a second OSA 120. The optical module 100 also includes an electromagnetic interference (EMI) shield 130, a first housing structure 140, a printed circuit board (PCB) 150, a lever 160, a latch 170, a clamp 180, and a second housing structure 190, as well as an optical-fiber receptacle 101 at a front end of the optical module 100, and an electrical connector 102 at a back end of the optical module 100.

The optical-fiber receptacle 101 is for receiving an optical-fiber connector. In the illustrated embodiment, the optical-fiber receptacle 101 is a dual-port receptacle for receiving ends of two connectorized optical fibers. Typically, the optical-fiber receptacle 101 is a duplex Lucent connector (LC) receptacle, and the optical fibers are connectorized with a duplex LC connector. However, the optical-fiber receptacle 101 may take any form suitable for mating with at least one optical fiber according to the function of the optical module 100. For example, a uni-directional module would require a single-port receptacle.

The electrical connector 102 is for connecting to an electrical connector socket. In the illustrated embodiment, the electrical connector 102 is an edge connector for connecting to an edge-connector socket, e.g., an SFP socket, in the host device. However, the electrical connector 102 may take any form suitable for mating with the host device.

The first OSA 110 and the second OSA 120 may be any type of optical subassembly for transmitting an outgoing optical signal or receiving an incoming optical signal. Typically, the first OSA 110 is a transmitter optical subassembly (TOSA) for receiving an outgoing electrical signal from the host device, via the PCB 150, for converting the outgoing electrical signal into an outgoing optical signal, and for transmitting the outgoing optical signal to the optical network. Also typically, the second OSA 120 is a receiver optical subassembly (ROSA) for receiving an incoming optical signal from the optical network, for converting the incoming optical signal into an incoming electrical signal, and for transmitting the incoming electrical signal to the host device, via the PCB 150.

The conventional designs of the first OSA 110 and the second OSA 120 are well-known in the art. In particular, the first OSA 110 and the second OSA 120 include a first sleeve 111 and a second sleeve 121, respectively, at front ends thereof, which form part of the optical fiber receptacle 101. Typically, the first OSA 110 and the second OSA 120 also include a first flange 112 and a second flange 122 adjacent to the first sleeve 111 and the second sleeve 121, respectively.

The first OSA 110 and the second OSA 120 are electrically connected at back ends thereof to the PCB 150. The first OSA 110 and the second OSA 120 may be connected to the PCB 150 through direct attachment and/or flex attachment, as is well known in the art. In the illustrated embodiment, the first OSA 110 is directly attached via pins 113, whereas the second OSA 120 is attached via a flex connector 123.

Figure 5A:
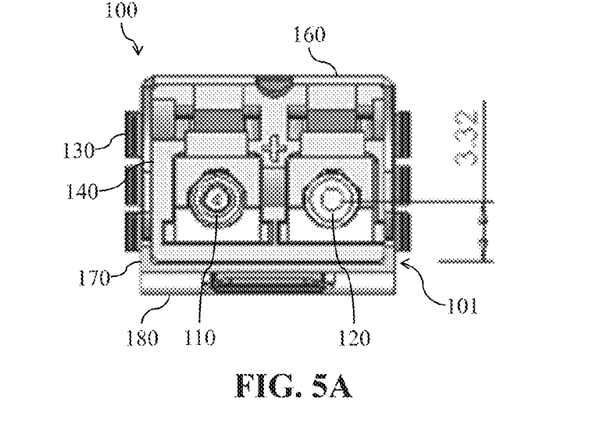
FIG. 5A is a front view of the embodiment of FIG. 1A.
Figure 5B:
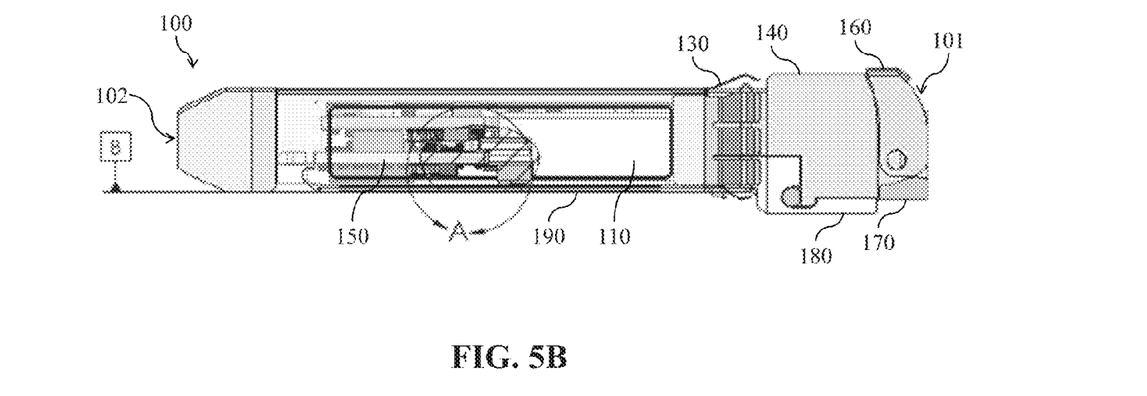
FIG. 5B is a cross-sectional side view of the embodiment of FIG. 1A.
Figure 5C:
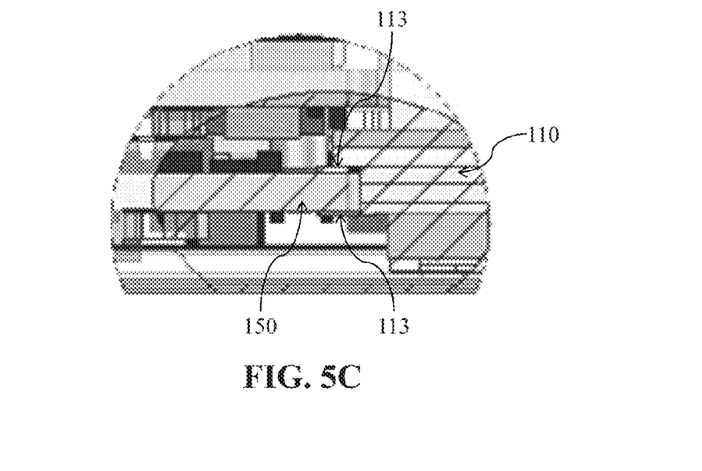
FIG. 5C is an enlargement of a portion of FIG. 5B showing the direct connection between the dual row of pins and the dual row of pads.

With particular reference to FIG. 5, in a preferred embodiment, in which the first OSA 110 is a TOSA, a dual row of pins 113 at the back end of the TOSA 110 is directly connected to a dual row of pads 151 at a front end of the PCB 150. Advantageously, this direct attachment, without pin forming, provides the shortest path between the TOSA 110 and the PCB 150, improving radio-frequency (RF) performance. This direct attachment also maximizes the space available for PCB layout, allowing higher functional densities. In some conventional optical modules, direct attachment is not possible because of height limitations imposed by the latch mechanism or other components.

Figure 6:
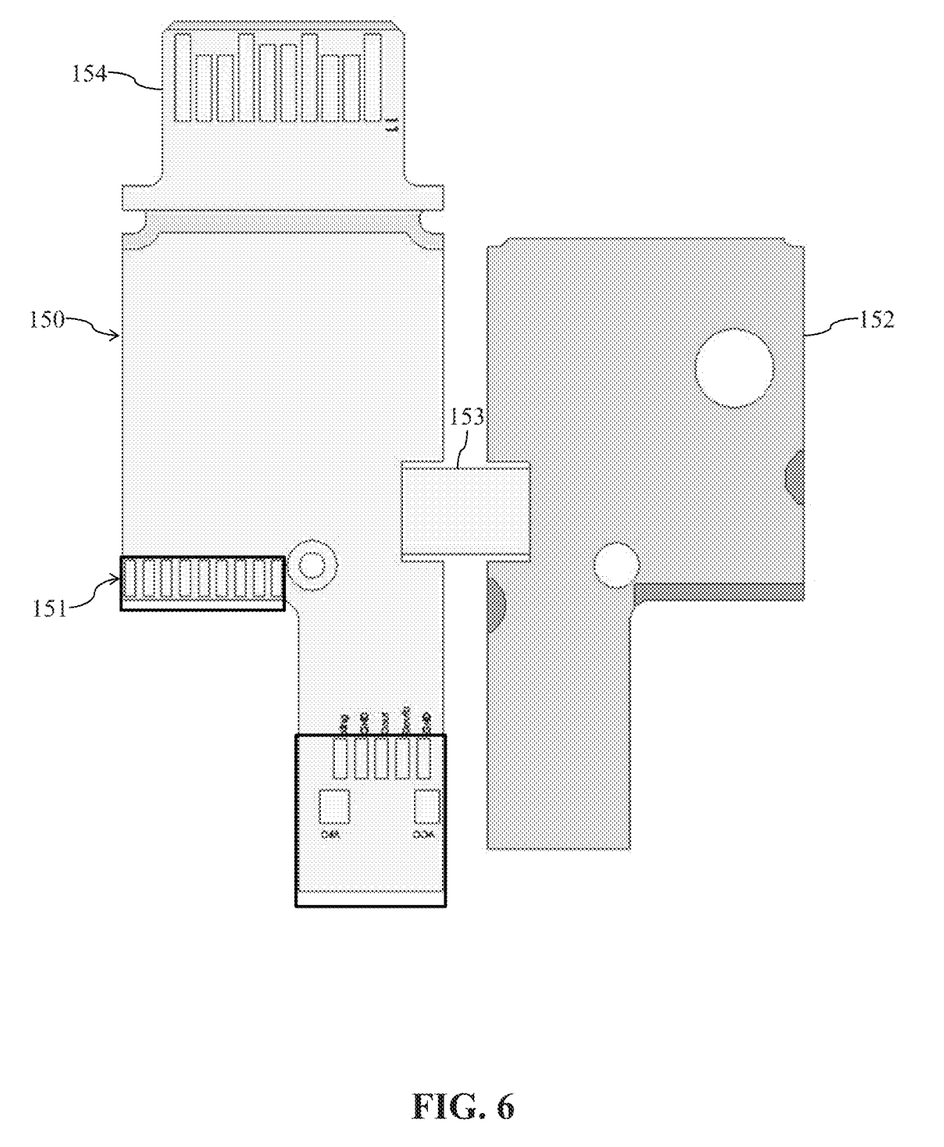
FIG. 6 is a schematic illustration of the printed circuit board (PCB) of the embodiment of FIG. 1A.

FIG. 6 illustrates the difference in space required for direct attachment and for flex attachment. The boxes indicate the total space required, including both PCB space and space behind the OSA package. For flex attachment, additional space is needed behind the OSA package to clear the bent flex connector 123 and make the connection. Accordingly, flex attachment requires considerably more space than direct attachment. In the embodiment illustrated in FIG. 6, direct attachment requires 1.5 mm in the length direction, whereas flex attachment requires 4.8 mm.

Typically, the PCB 150 is attached to a daughter card 152 via a flex connector 153, in a rigid-flex-rigid configuration. The PCB 150 and the daughter card 152, typically, include circuits for supporting and monitoring the conversion of optical signals to electrical signals and of electrical signals to optical signals, e.g., transimpedance amplifiers (TIAs) and a laser driver. An edge 154 at a back end of the PCB 150 forms part of the electrical connector 102. Preferably, the optical module 100 also includes thermal interface material (TIM) pads 155 for thermally critical components on the PCB 150.

Together, the first housing structure 140, which functions as a supporting housing structure, and the second housing structure 190, which functions as a covering housing structure, form a two-part housing that houses the first OSA 110, the second OSA 120, and the PCB 150. The first housing structure 140 supports the first OSA 110, the second OSA 120, and the PCB 150, and the second housing structure 190 at least partially covers the first OSA 110, the second OSA 120, and the PCB 150.

Figure 7A:
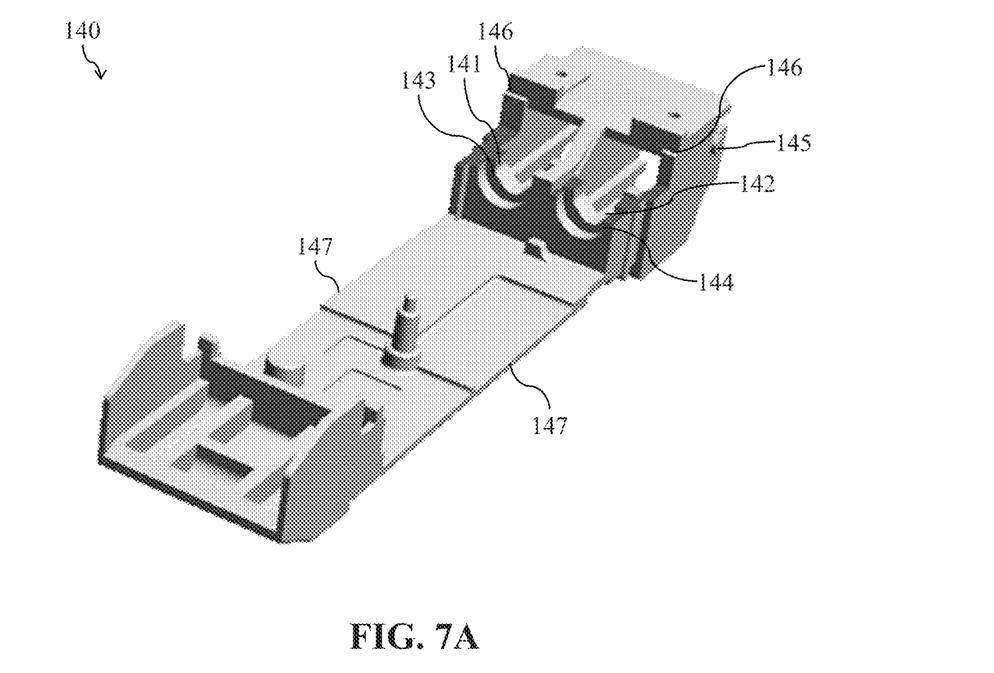
FIG. 7A is a first perspective view of the first housing structure of the embodiment of FIG. 1A.
Figure 7B:
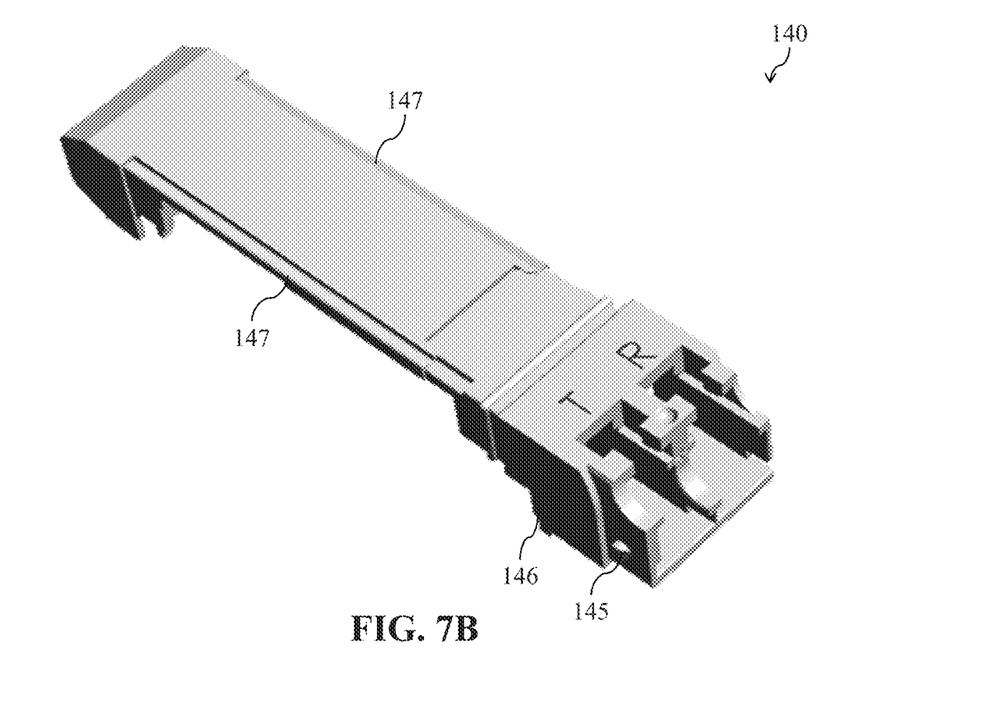
FIG. 7B is a second perspective view of the first housing structure of the embodiment of FIG. 1A.

With particular reference to FIG. 7, the first housing structure 140 includes a first OSA recess 141 and a second OSA recess 142 at a front end thereof, for supporting and positioning the first OSA 110 and the second OSA 120, respectively. Typically, the first OSA recess 141 and the second OSA recess 142 are generally V-shaped recesses, i.e., V-grooves, shaped to accommodate the first sleeve 111 of the first OSA 110 and the second sleeve 121 of the second OSA 120, respectively. Preferably, the first housing structure 140 also includes a first flange recess 143 adjacent to the first OSA recess 141 and a second flange recess 144 adjacent to the second OSA recess 142, for setting and holding the first OSA 110 and the second OSA 120, respectively, in position. The first flange recess 143 and the second flange recess 144 are, typically, deeper semi-cylindrical recesses shaped to accommodate the first flange 112 of the first OSA 110 and the second flange 122 of the second OSA 120, respectively.

The first housing structure 140 also supports the lever 160, the latch 170, and the clamp 180. Together, the lever 160 and the latch 170 form a latch mechanism allowing the optical module 100 to be releasably mounted in the cage of the host device. The latch mechanism has a latched position, in which the optical module 100 is secured to the cage, and an unlatched position, in which the optical module 100 is released from the cage.

Figure 2A:
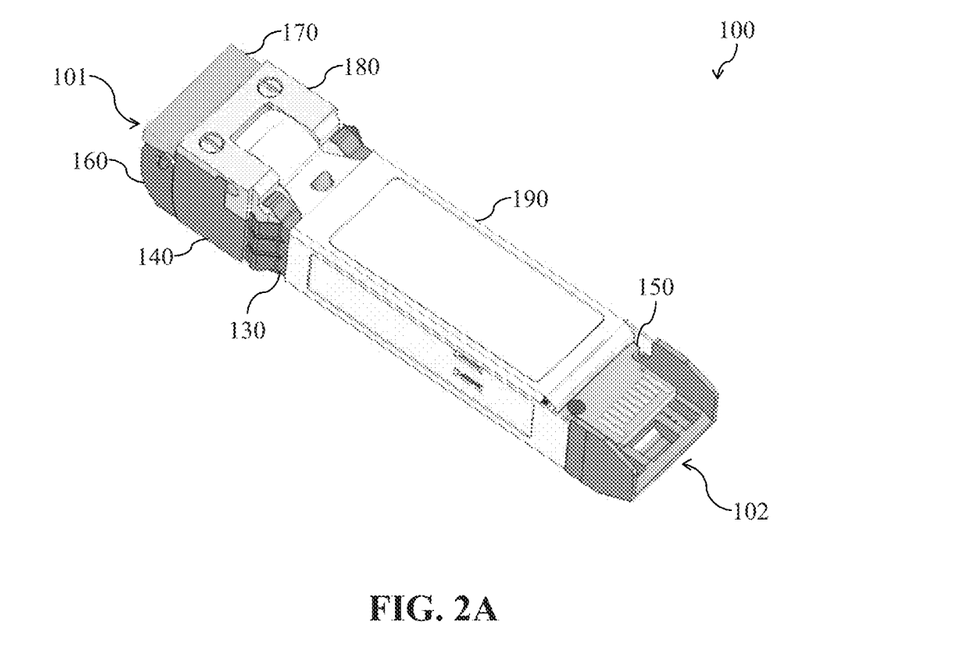
FIG. 2A is a first isometric view of the embodiment of FIG. 1A with the latch mechanism in the latched position.
Figure 2B:
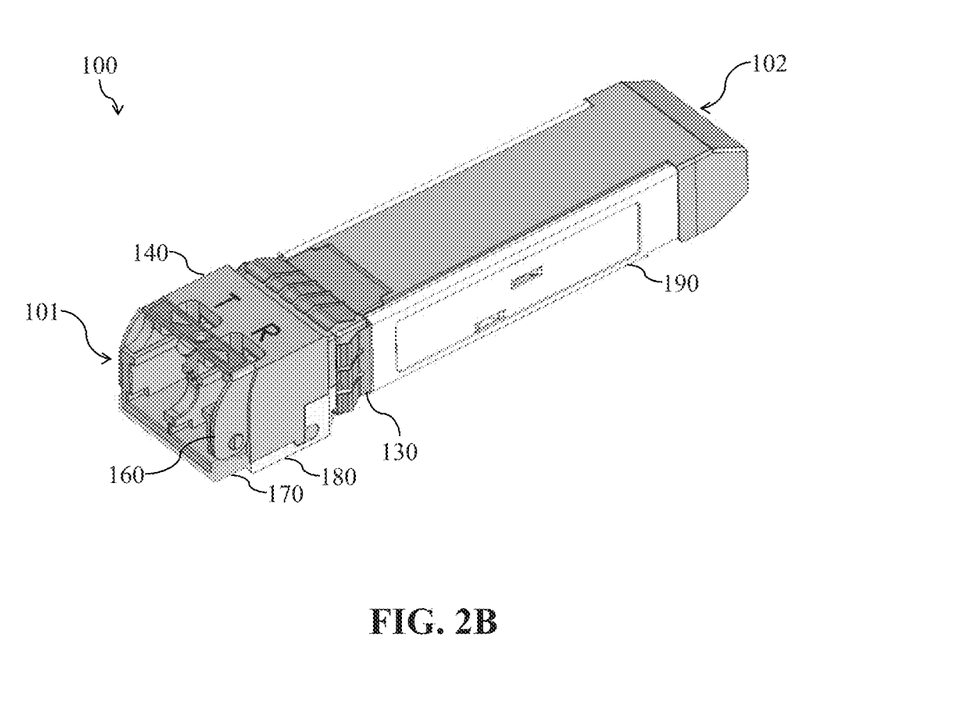
FIG. 2B is a second isometric view of the embodiment of FIG. 1A with the latch mechanism in the latched position.
Figure 3A:
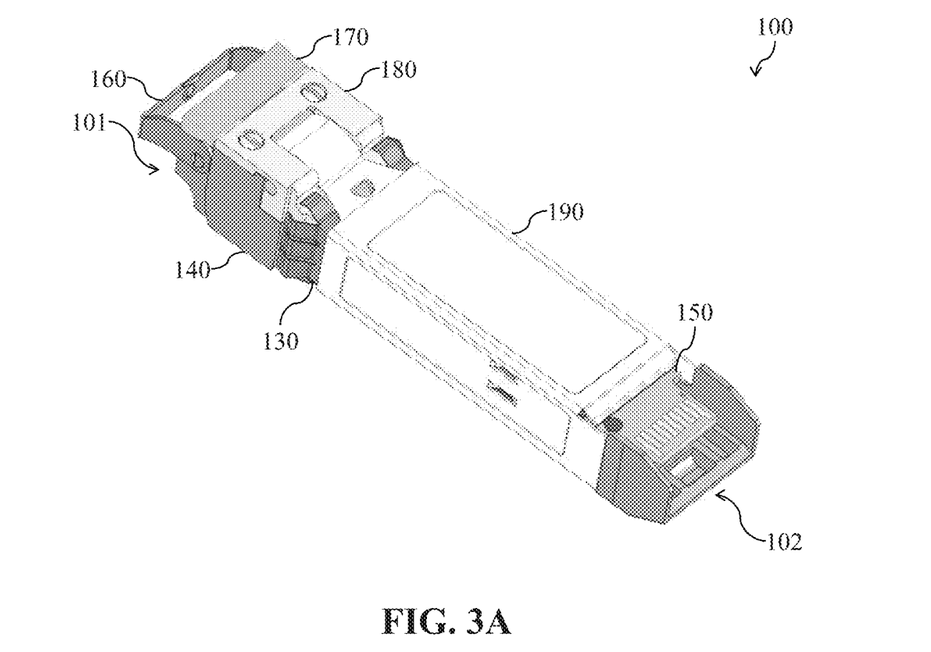
FIG. 3A is a first isometric view of the embodiment of FIG. 1A with the latch mechanism in the unlatched position.
Figure 3B:
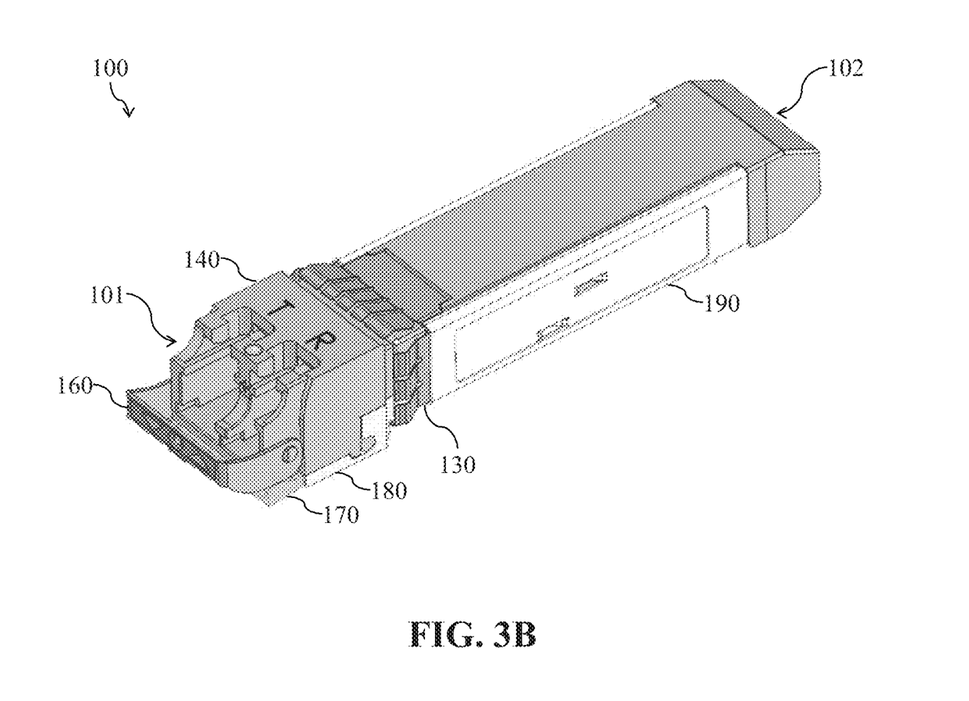
FIG. 3B is a second isometric view of the embodiment of FIG. 1A with the latch mechanism in the unlatched position.

The lever 160 is rotatably mounted on the first housing structure 140 at the front end thereof, such that the lever 160 can rotate between the latched position and the unlatched position. In the latched, i.e., closed, position, the lever 160 extends, generally vertically, along the front end of the optical module 100, as shown in FIG. 2. In the unlatched, i.e., open, position, the lever 160 extends, generally horizontally, outward from the front end of the optical module 100, as shown in FIG. 3.

In the illustrated embodiment, the lever 160 is in the form of a bail. The bail includes two opposing, generally parallel, arms 161, which extend along sides of the front end of the optical module 100 in the latched position. The lever 160 also includes a handle 162 between the two arms 161, which can be grasped by a user to rotate the bail. The arms 161, typically, include pivot holes 163 at ends thereof opposite the handle 162, for receiving pivot posts 145 on sides of the first housing structure 140, which define the rotation axis of the bail. The bail is mounted on the first housing structure 140 such that the pivot posts 145 extend into the pivot holes 163 of the arms 161, allowing the bail to rotate about the pivot posts 145. The arms 161, typically, also include cams 164, i.e., eccentric portions, at the ends thereof opposite the handle 162. That is, the pivot holes 163 are not disposed centrally relative to front and back edges of the arms 161. Together, the cams 164 provide a first abutment surface for engaging the latch 170 when the lever 160 is rotated to the unlatched position.

Figure 8A:
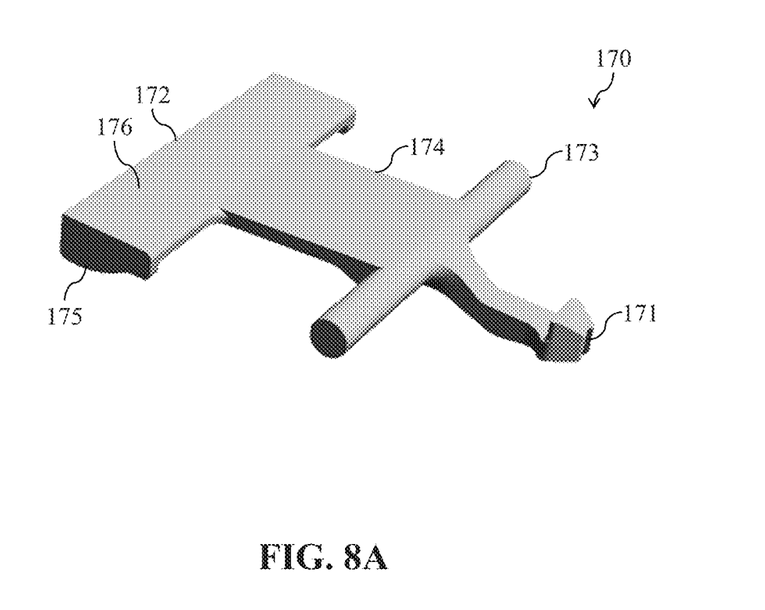
FIG. 8A is a first perspective view of the latch of the embodiment of FIG. 1A.
Figure 8B:
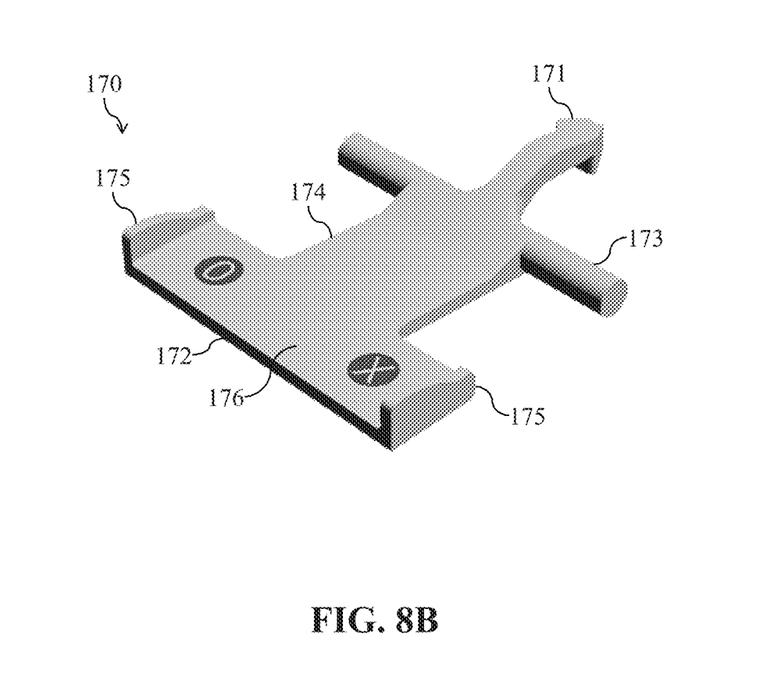
FIG. 8B is a second perspective view of the latch of the embodiment of FIG. 1A.

With particular reference to FIG. 8, the latch 170 includes a latch hook 171 at a back end thereof and an actuator 172 at a front end thereof. The latch 170 also includes a pivot pin 173 between the latch hook 171 and the actuator 172, which defines the rotation axis of the latch 170. Typically, the latch 170 further includes a latch body 174 between the actuator 172 and the pivot pin 173, which is, generally, narrower than both the actuator 172 and the pivot pin 173. Preferably, the actuator 172 and the pivot pin 173 have substantially the same width as the first housing structure 140.

In the illustrated embodiment, the actuator 172 includes two opposing, generally parallel, abutment tabs 175. The actuator 172 also includes an actuator body 176 between the two abutment tabs 175. In the latched position, the actuator body 176 is seated on the first housing structure 140. The abutment tabs 175 extend, generally perpendicularly, from the actuator body 176 toward the arms 161 of the bail, along the sides of the front end of the optical module 100. Preferably, the abutment tabs 175 are wider at a front end thereof and narrower at a back end thereof, such that the abutment tabs 175 have curved or angled edges opposite the actuator body 176. The edges of the abutment tabs 175 provide a second abutment surface, spaced from the surface of the actuator body 176, for engaging the lever 160, specifically, the first abutment surface, when the lever 160 is rotated to the unlatched position. This actuator design allows the actuator body 176 to be relatively thin. Preferably, the actuator body 176 has a thickness of less than about 0.6 mm. For example, the actuator body 176 may have a thickness of between about 0.5 mm and about 0.6 mm.

Advantageously, reducing the thickness of the actuator body 176 provides greater flexibility in positioning the first OSA 110 and the second OSA 120, more specifically, the optical axes of the first OSA 110 and the second OSA 120, within the two-part housing. In particular, reducing the thickness allows optical axes of the first OSA 110 and the second OSA 120 to be positioned closer to the second housing structure 190.

With particular reference to FIG. 5, this greater flexibility is particularly advantageous in the preferred embodiment, in which the first OSA 110 is a TOSA. For performance reasons, the optical axis of the TOSA is linked to the position of the dual row of pins 113 at the back end of the TOSA. Moreover, the position of the PCB 150 relative to the second housing structure 190 is, generally, fixed by standard, e.g., the SFP standard. Therefore, to connect the TOSA and the PCB 150 through direct attachment, i.e., to align the dual row of pins 113 on the TOSA with the dual row of pads 151 on the PCB 150, both the TOSA and the second OSA 120, typically, a ROSA, have to be moved closer to the second housing structure 190. In some conventional optical modules, the design of the latch mechanism and/or the thickness of the latch restricts the positioning of the optical axis of at least one OSA relative to the housing. In the optical module 100 of the present invention, the optical axes of the first OSA 110 and the second OSA 120 are, typically, positioned less than about 3.4 mm from the second housing structure 190. In the embodiment illustrated in FIG. 5, the optical axes of the first OSA 110 and the second OSA 120 are positioned 3.32 mm from second housing structure 190.

Figure 9A:
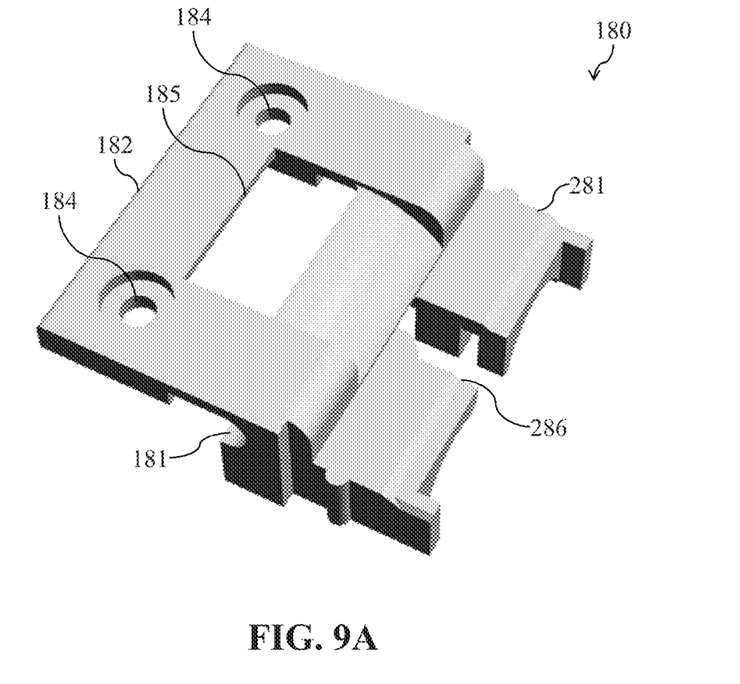
FIG. 9A is a first perspective view of the clamp of the embodiment of FIG. 1A.
Figure 9B:
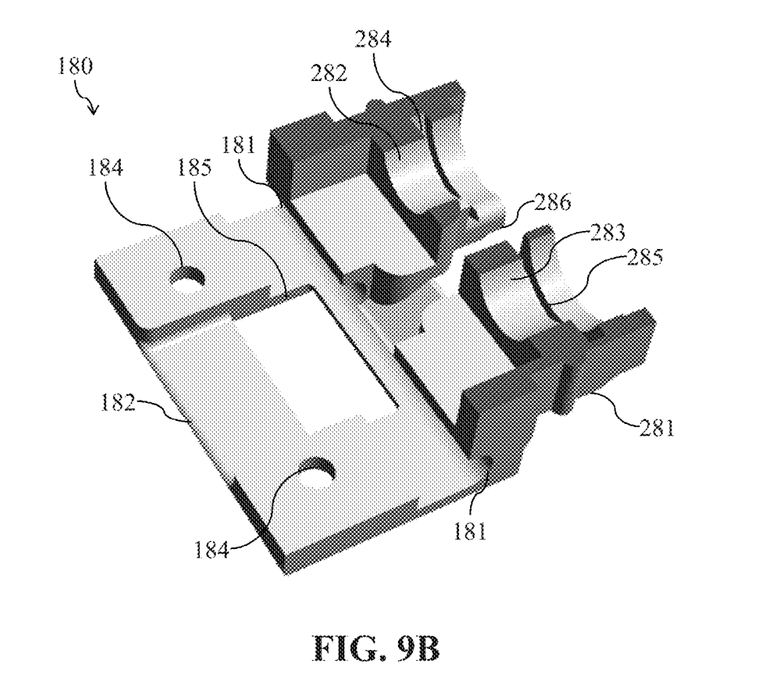
FIG. 9B is a second perspective view of the clamp of embodiment of FIG. 1A.

With particular reference to FIG. 9, the clamp 180 is mounted on the first housing structure 140 and secures the first OSA 110, the second OSA 120, and the latch 170 to the first housing structure 140. The first housing structure 140 and the clamp 180 cooperate to rotatably support the pivot pin 173 of the latch 170. The first housing structure 140 includes a first partial bearing surface at the front end thereof, and the clamp 180 includes a second partial bearing surface. Together, the first partial bearing surface and the second partial bearing surface form a complete bearing surface for the pivot pin 173. The complete bearing surface surrounds the pivot pin 173 and holds the pivot pin 173 while allowing rotation thereof. Preferably, the first housing structure 140 includes at least one first pivot recess 146, which forms the first partial bearing surface, the clamp 180 includes at least one second pivot recess 181, which forms the second partial bearing surface, and the first pivot recess 146 and the second pivot recess 181 cooperate to form the complete bearing surface and to rotatably support the pivot pin 173.

In the illustrated embodiment, the first housing structure 140 includes two opposing first pivot recesses 146 at the sides of the first housing structure 140. Likewise, the clamp 180 includes two opposing second pivot recesses 181 at sides of the clamp 180. When assembled, the first pivot recesses 146 and the second pivot recesses 181 mate to surround the pivot pin 173 and, thereby, rotatably support the pivot pin 173.

The clamp 180 partially covers the latch 170 to further secure the latch 170. Typically, the clamp 180 includes a crossbar 182, which extends across the latch body 174, partially covering the latch body 174. Generally, the crossbar 182 is wider than the latch body 174. Preferably, the crossbar 182 has substantially the same width as the first housing structure 140. Also preferably, the clamp 180 is mounted on the first housing structure 140 by means of fasteners 183, e.g., threaded fasteners. In the illustrated embodiment, opposite ends of the crossbar 182 are fastened to the first housing structure 140. More specifically, the crossbar 182 has thicker ends and includes fastener holes 184 at the thicker ends thereof for receiving the fasteners 183 to secure the clamp 180 to the first housing structure 140.

The clamp 180 also includes a tab opening 185, adjacent to the crossbar 182, the function of which is described in further detail hereafter. The clamp 180 further includes a yoke 281 at the back end thereof to secure the first OSA 110 and the second OSA 120 to the first housing structure 140. The yoke 281 is shaped to mate with the first housing structure 140 to receive the front ends of the first OSA 110 and the second OSA 120.

In the illustrated embodiment, the yoke 281 includes a third OSA recess 282 and a fourth OSA recess 283 for holding the first OSA 110 and the second OSA 120, respectively. The third OSA recess 282 and the fourth OSA recess 283 are semi-cylindrical recesses shaped to accommodate the first sleeve 111 of the first OSA 110 and the second sleeve 121 of the second OSA 120, respectively, and to mate with the first OSA recess 141 and the second OSA recess 142 in the first housing structure 140, respectively. The first OSA recess 141 and the third OSA recess 282 cooperate to form a first positioning channel for receiving the first sleeve 111. Likewise, the second OSA recess 142 and the fourth OSA recess 283 cooperate to form a second positioning channel for receiving the second sleeve 121.

Preferably, the yoke 281 also includes a third flange recess 284 adjacent to the third OSA recess 282 and a fourth flange recess 285 adjacent to the fourth OSA recess 283, for holding the first OSA 110 and the second OSA 120, respectively, in position. The third flange recess 284 and the fourth flange recess 285 are, typically, deeper semi-cylindrical recesses shaped to accommodate the first flange 112 of the first OSA 110 and the second flange 122 of the second OSA 120, respectively, and to mate with the first flange recess 143 and the second flange recess 144 in the first housing structure 140, respectively. The yoke 281, typically, further includes a hook gap 286 through which the latch hook 171 extends to engage the cage in the latched position.

Figure 4:
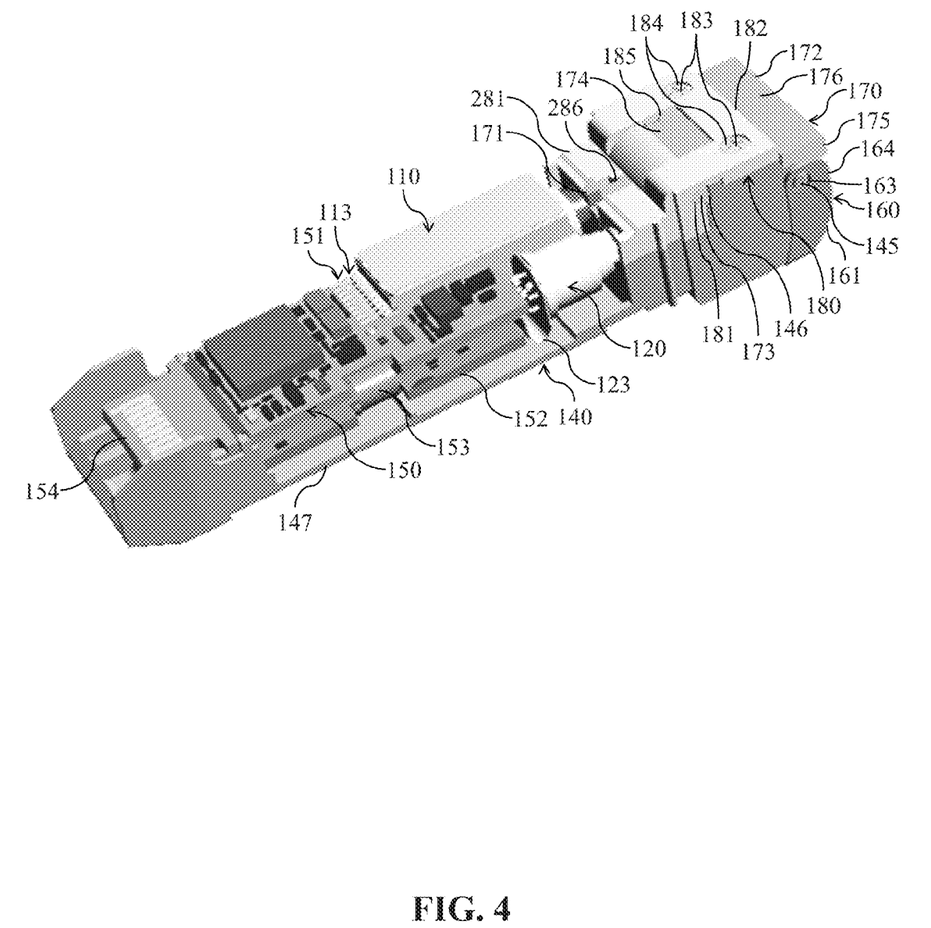
FIG. 4 is perspective view of the embodiment of FIG. 1A, prior to installation of the electromagnetic interference (EMI) shield and the second housing structure.

Advantageously, in the present invention, a single component, the clamp 180, secures the first OSA 110, the second OSA 120, and the latch 170 to the first housing structure 140. Moreover, before the second housing structure 190 is installed, the clamp 180 holds the first OSA 110, the second OSA 120, and the latch 170 in place, while providing access to the PCB 150, as well as to the back ends of the first OSA 110 and the second OSA 120. This design greatly facilitates the assembly and/or testing of the first OSA 110, the second OSA 120, and the PCB 150.

The first housing structure 140 also supports the EMI shield 130 and the second housing structure 190. The EMI shield 130, which is for reducing the passage of EMI into and out of the cage of the host device, is mounted around the first housing structure 140 at the front end thereof. Typically, the EMI shield 130 includes spring fingers 131, which extend into contact with the cage. Preferably, the optical module 100 also includes a soft-molded EMI O-ring, consisting of two parts 132.

Typically, the second housing structure 190 is mounted on the first housing structure 140 to at least partially cover the PCB 150. In the illustrated embodiment, the second housing structure 190 is a three-sided, generally rectangular, housing structure and is mounted over and around the PCB 150, the first OSA 110, the second OSA 120, and the EMI shield 130. Thereby, the second housing structure 190 covers at least the front end of the PCB 150 and the back ends of the first OSA 110, the second OSA 120, and the EMI shield 130. The PCB 150 is substantially covered, with exception of the edge 154 at the back end thereof. Preferably, the second housing structure 190 includes bent side edges 191 for engaging side edges 147 of the first housing structure 140 to form the two-part housing.

Typically, the second housing structure 190 also includes a spring tab 192, i.e., a leaf spring, at a front end thereof for biasing the latch 170 into the latched position. In the illustrated embodiment, the spring tab 192 extends over the clamp 180 into contact with the latch 170. More specifically, the spring tab 192 extends over the yoke 281 and through the tab opening 185 into contact with the latch body 174. Typically, the spring tab 192 includes a hook opening 193 through which the latch hook 171 extends to engage the cage in the latched position. Preferably, the spring tab 192 is a curved spring tab.

In the manufacture of some conventional optical modules, the covering housing structure is slid horizontally onto the supporting housing structure to assemble the two-part housing structure. In contrast, in the manufacture of the optical module 100 of the present invention, the second housing structure 190 is installed vertically, i.e., in a perpendicular direction relative to the PCB 150. Typically, a specialized fixture is used to open sides of the second housing structure 190 outwards during the installation. Advantageously, vertical installation of the second housing structure 190 makes it easier to achieve proper functioning of the spring tab 192. Furthermore, vertical installation allows more flexibility in terms of component placement on the PCB 150, as the components do not have to be clear of a sliding path.

Figure 10A:
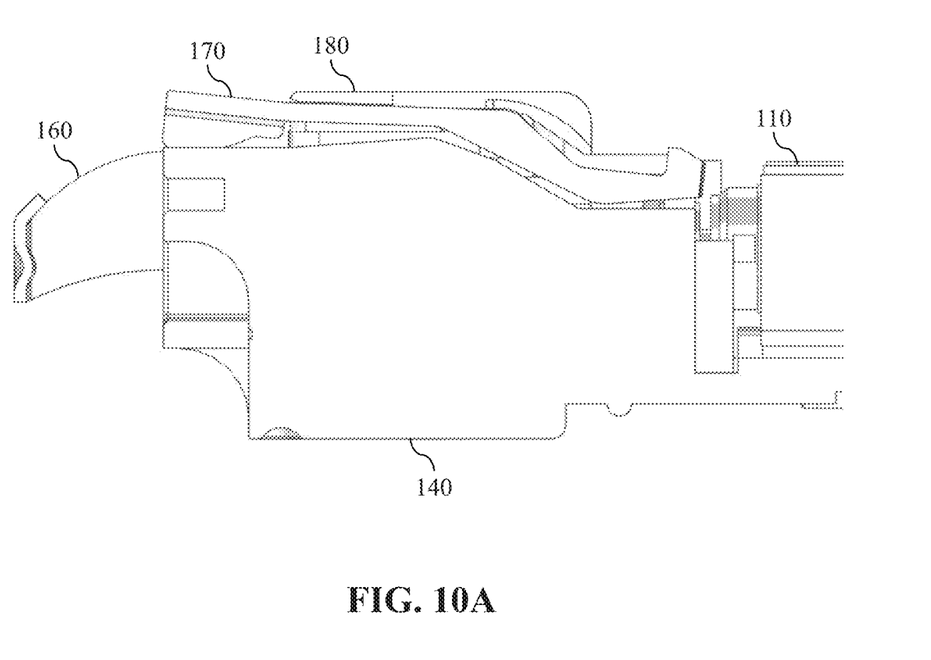
FIG. 10A is a cross-sectional side view of the front end of the embodiment of FIG. 1A with the latch mechanism in the unlatched position, prior to installation of the EMI shield and the second housing structure.
Figure 10B:
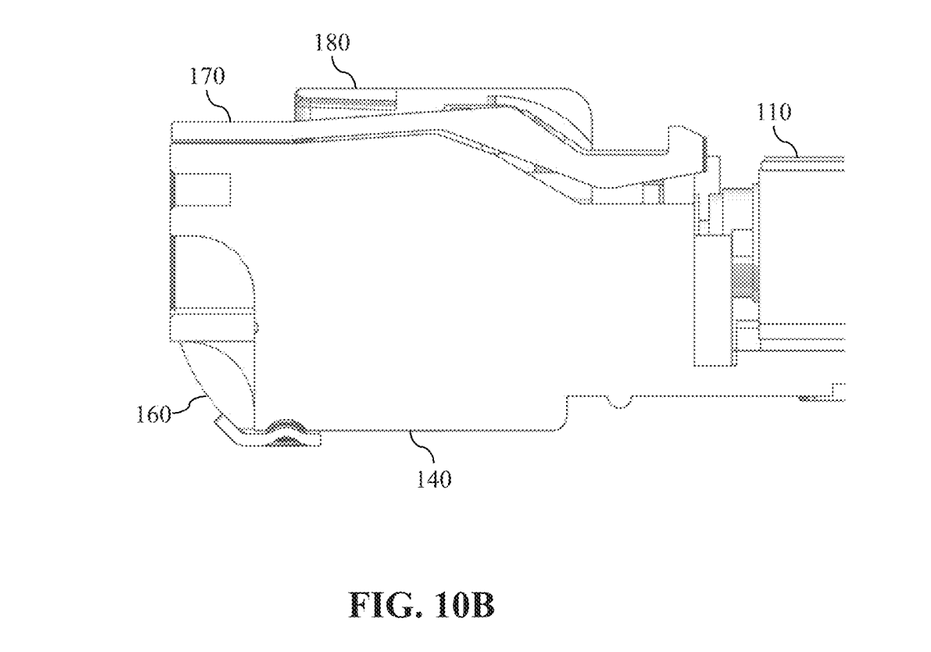
FIG. 10B is a cross-sectional side view of the front end of the embodiment of FIG. 1A with the latch mechanism in the latched position, prior to installation of the EMI shield and the second housing structure.

With particular reference to FIG. 10, to mount the optical module 100 in the cage of the host device, the optical module 100 is inserted into the cage with the lever 160 in the unlatched, i.e., open, position, as shown in FIG. 10A. To secure the optical module 100 to the cage, the lever 160 is rotated to the latched, i.e., closed, position, as shown in FIG. 10B, in which the latch hook 171 engages the cage. The spring tab 192 biases the latch 170 to rotate about the pivot pin 173 into the latched position. More specifically, in the illustrated embodiment, the spring tab 192 applies a spring force to the latch body 174. Accordingly, the actuator 172 moves into contact with the first housing structure 140, and the latch body 174 moves out of contact with the crossbar 182 of the clamp 180. Meanwhile, the latch hook 171 extends through the hook gap 286 in the yoke 281 of the clamp 180 and through the hook opening 193 in the spring tab 192 of the second housing structure 190 to engage the cage.

To release the optical module 100 from the cage, the lever 160 is rotated to the unlatched, i.e., open, position, in which the latch hook 171 is disengaged from the cage. Upon rotating from the latched position to the unlatched position, the lever 160 engages the actuator 172 to rotate the latch 170 about the pivot pin 173 and disengage the latch hook 171 from the cage. More specifically, in the illustrated embodiment, the cams 164 on the arms 161 of the lever 160 in the form of a bail engage the abutment tabs 175 on the actuator 172 of the latch 170 to rotate the latch 170. Accordingly, the actuator 172 moves out of contact with the first housing structure 140, and the latch body 174 moves into contact with the crossbar 182 of the clamp 180. Meanwhile, the latch hook 171 is retracted through the hook opening 193 in the spring tab 192 of the second housing structure 190 and through the hook gap 286 in the yoke 281 of the clamp 180. The optical module 100 can then be withdrawn, i.e., unmounted, from the cage with the aid of the lever 160.

Of course, numerous other embodiments may be envisaged without departing from the spirit and scope of the invention.

I claim:

1. An optical module for mounting in a cage of a host device, comprising:
   a first housing structure;
   a first optical subassembly (OSA) supported by the first housing structure;
   a printed circuit board (PCB) supported by the first housing structure and electrically connected to the first OSA;
   a clamp mounted on the first housing structure to secure the first OSA while providing access to the PCB when the PCB is uncovered;
   a latch supported by the first housing structure and secured by the clamp, including a latch hook at one end thereof, an actuator at an opposite end thereof, and a pivot pin therebetween, the pivot pin rotatably supported by the first housing structure and the clamp in cooperation;
   a lever rotatably mounted on the first housing structure to rotate between a latched position, in which the latch hook engages the cage, and an unlatched position, in which the latch hook is disengaged from the cage, wherein, upon rotating from the latched position to the unlatched position, the lever engages the actuator to rotate the latch about the pivot pin and disengage the latch hook from the cage; and
   a second housing structure supported by the first housing structure to at least partially cover the PCB.

2. The optical module of claim 1, further including a second OSA supported by the first housing structure, secured by the clamp, and electrically connected to the PCB.

3. The optical module of claim 2, wherein the first OSA is a transmitter optical subassembly (TOSA); and wherein the second OSA is a receiver optical subassembly (ROSA).

4. The optical module of claim 3, wherein the TOSA includes a dual row of pins; wherein the PCB includes a dual row of pads; and wherein the PCB is electrically connected to the TOSA through a direct connection between the dual row of pads and the dual row of pins.

5. The optical module of claim 2, wherein the first housing structure includes a first OSA recess supporting the first OSA, and a second OSA recess supporting the second OSA.

6. The optical module of claim 5, wherein the clamp includes a third OSA recess holding the first OSA, and a fourth OSA recess holding the second OSA; wherein the first OSA includes a first sleeve; wherein the second OSA includes a second sleeve; wherein the first OSA recess and the third OSA recess cooperate to form a first positioning channel receiving the first sleeve; and wherein the second OSA recess and the fourth OSA recess cooperate to form a second positioning channel receiving the second sleeve.

7. The optical module of claim 1, wherein the first housing structure includes a first partial bearing surface; wherein the clamp includes a second partial bearing surface; and wherein the first partial bearing surface and the second partial bearing surface form a complete bearing surface for the pivot pin.

8. The optical module of claim 1, wherein the first housing structure includes a first pivot recess; wherein the clamp includes a second pivot recess; and wherein the first pivot recess and the second pivot recess cooperate to rotatably support the pivot pin.

9. The optical module of claim 1, wherein the actuator includes two opposing abutment tabs and an actuator body therebetween; wherein the lever is a bail including two opposing arms and a handle therebetween, each arm including a cam at an end thereof opposite the handle; and wherein upon rotating the lever from the latched position to the unlatched position, the cams engage the abutment tabs to rotate the latch about the pivot pin and disengage the latch hook from the cage.

10. The optical module of claim 9, wherein the PCB is electrically connected to the first OSA through a direct connection between pads on the PCB and pins on the first OSA.

11. The optical module of claim 9, wherein the abutment tabs have curved edges opposite the actuator body.

12. The optical module of claim 9, wherein the actuator body has a thickness of less than about 0.6 mm.

13. The optical module of claim 1, wherein the clamp includes a yoke securing the first OSA to the first housing structure.

14. The optical module of claim 13, wherein the latch further includes a latch body between the actuator and the pivot pin; and wherein the clamp further includes a crossbar extending across the latch body.

15. The optical module of claim 14, wherein the latch body is narrower than the actuator and the pivot pin; and wherein opposite ends of the crossbar are fastened to the first housing structure.

16. The optical module of claim 1, wherein the second housing structure is a three-sided housing structure vertically mounted on the first housing structure.

17. The optical module of claim 16, wherein the second housing structure includes a spring tab biasing the latch into the latched position.

18. The optical module of claim 17, wherein the spring tab is a curved spring tab.

19. The optical module of claim 17, wherein the latch further includes a latch body between the actuator and the pivot pin; wherein the clamp includes a tab opening; and wherein the spring tab extends through the tab opening into contact with the latch body.

20. The optical module of claim 19, wherein the clamp further includes a hook gap; wherein the spring tab includes a hook opening; and wherein the latch hook extends through the hook gap and the hook opening to engage the cage in the latched position.

* * * * *